July 18, 1944.   R. S. COLLEY   2,353,650
APPARATUS FOR INSTALLING ELASTIC COVERS
Filed June 15, 1943
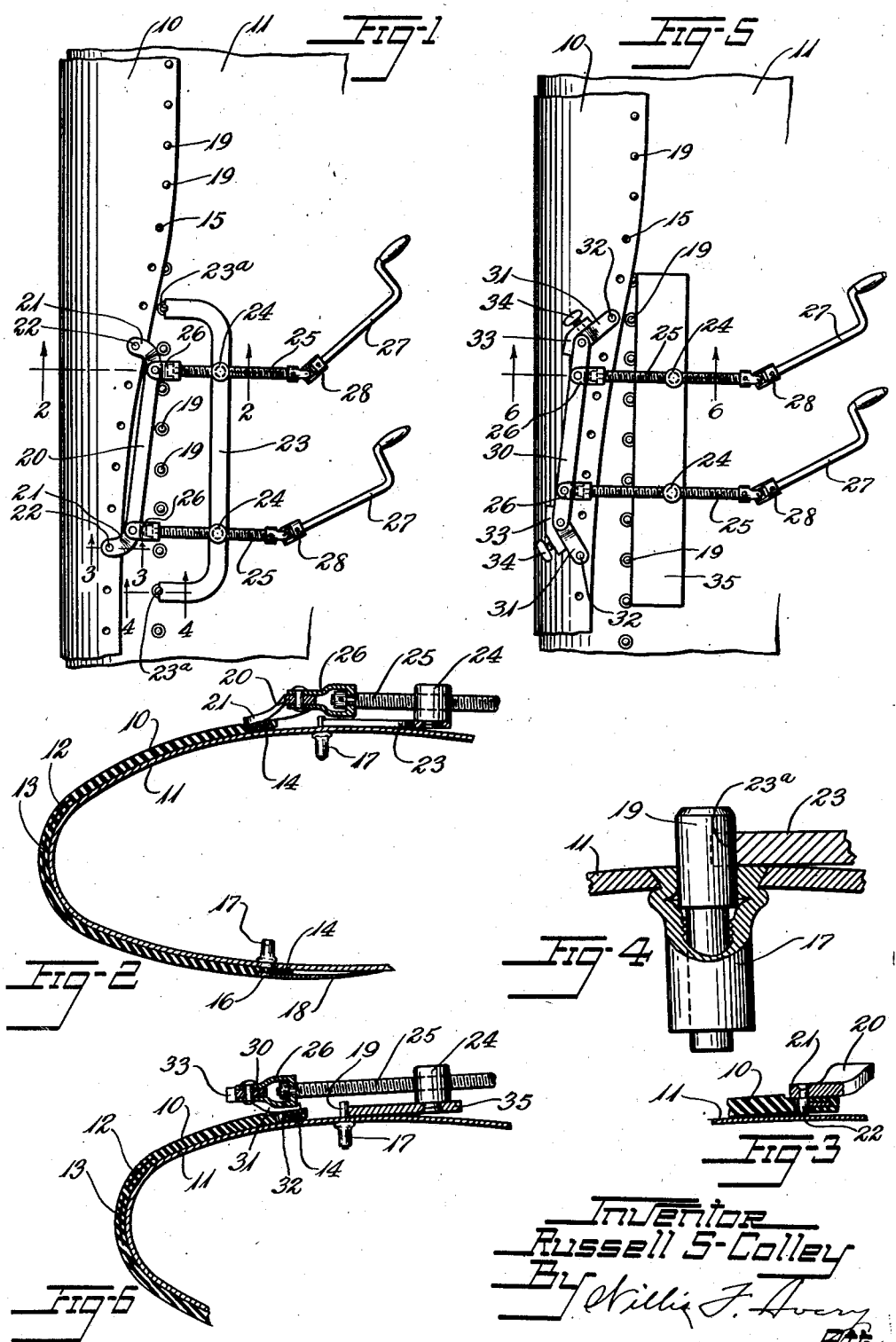
Inventor
Russell S. Colley
By Willis F. Avery
Atty.

UNITED STATES PATENT OFFICE 2,353,650

APPARATUS FOR INSTALLING ELASTIC COVERS

Russell S. Colley, Kent, Ohio, assignor to The B. F. Goodrich Company, New York, N. Y., a corporation of New York Application June 15, 1943, Serial No. 490,919

12 Claims. (Cl. 254—67)

This invention relates to the installation of elastic covers upon the surfaces of aircraft, and has for an object the provision of apparatus for facilitating the installing operation.

The invention is useful especially in the installation of inflatable shoes for preventing the accumulation of ice upon the leading edges of airfoils and other surfaces of aircraft, which shoes are mounted in a condition of stretch chordwise of the airfoil and are held in place by screws set through apertures in the margins of the shoes and retained in hollow, internally threaded rivets in the skin of the aircraft. In performing the stretching operation manually it has sometimes been difficult to stretch the shoe uniformly and without injury to the shoe, and in the case of large installations the stretching force required has sometimes exceeded that which may be conveniently supplied by hands alone.

Further objects are to provide for reducing manual effort to effect the stretching and fastening, to provide for greater evenness in the application of the shoes or coverings, to avoid the effects of forces tending to buckle or wrinkle the coverings, to avoid injury to the covering and aircraft surface, and to provide for convenient and rapid attachment and detachment of the apparatus.

These and further objects will be apparent from the following description, reference being had to the accompanying drawing in which:

Fig. 1 is a plan view of the leading edge of an airfoil with an elastic shoe in the course of application thereto by means of apparatus constructed in accordance with and embodying the invention, parts being broken away, Fig. 2 is a section taken along the line 2—2 of Fig. 1, Fig. 3 is a section taken along the line 3—3 of Fig. 1, Fig. 4 is a section taken along the line 4—4 of Fig. 1, Fig. 5 is a view like Fig. 1, but showing a modified construction, and Fig. 6 is a section taken along the line 6—6 of Fig. 4.

In the illustrated embodiments of the invention the apparatus is used in the installation of an elastic shoe 10 upon the leading edge of an airfoil 11. The shoe may be of a type having hollow portions 12, 13 for effecting inflation and distortion of the surface of the shoe for effecting ice removal, in known manner. The shoe is mounted upon the airfoil in a condition of chordwise stretch so as to maintain it taut upon the airfoil under a strong resilient holding force for resisting forces tending to lift the shoe from the airfoil. Both the upper and lower margins of the shoe may have a bead 14 of reinforcing wire or other suitable material embedded therein parallel to and close to the edge together with a row of apertures 15, 15 immediately in front of the bead so that the margins may be secured to the airfoil by holding screws such as 16 (Fig. 2) inserted through the apertures 15, 15 and into hollow, internally threaded rivets 17, 17 attached to the skin of the airfoil. A fairing strip 18 may also be held in place by the attaching screws 16, 16 to provide clean aerodynamic continuity of the surface.

In the drawing the lower margin of the shoe is first applied by the insertion of the screws 16, 16 through the fairing strip 18 and the apertures 15, 15 into the threaded rivets 17, 17. The lack of tension in the shoe at this stage makes the operation a simple one. Before attachment of the upper margin of the shoe it is required that the shoe be stretched chordwise a considerable extent, often 30% or more of its chordwise dimension. To facilitate this operation temporary holding pins 19, 19 are set in the upper hollow rivets 17, 17 so as to be received temporarily in the apertures 15, 15 of the shoe when the latter is stretched in position. The pins 19, 19 may then be replaced successively by the attaching screws. As most elastic shoes of the kind referred to herein are of considerable length it is most convenient to stretch and secure them on the temporary pins 19, 19, progressively along the length of the shoe. The apparatus of this invention facilitates this method of application.

In the embodiment of Figs. 1 to 4, the apparatus for drawing the margin of the shoe into alignment with the apertures 15, 15 with the temporary pins 19, 19 comprises a member 20 preferably of sufficient length to span a group of the apertures 15, 15 having end portions 21, 21 with projecting pins 22, 22 mounted therein for engagement in the apertures of the shoe. The end portions 21, 21 are preferably bent out of the plane of the central portion of the member 20 for a purpose which will be explained more fully hereinafter.

A bracing structure 23, which may be of plate-like construction has forwardly extending ends presenting edge portions 23a, 23a adapted to abut against a pair of the spaced-apart pins 19, 19. At spaced-apart positions along the plate 23 are mounted posts 24, 24, each preferably having some freedom of pivotal movement about the vertical axis as seen in Fig. 2, and each being in the form of a nut so as to receive the threads of the screw 25 of which there is one for each post or nut 24. The forward end of each screw 25 is pivotally attached to the member 20, as by means of a clevis 26. The arrangement is such that with the parts assembled, as shown in the drawing, the screws 25 may be rotated as by means of cranks 27, 27, which may have swivel connections 28, 28 with the screws, so that the screws are drawn through the nuts 24, 24 to pull the margin of the shoe into alignment of its apertures 15, 15 with the temporary pins 19, 19.

For the purpose of providing adequate clearance for the parts the posts 24, 24 are secured to the plate 23 well back of the line of pins 19, 19, and for this purpose also the ends of the plate 23 may be directed forwardly as shown. In order to avoid the effect of forces tending undesirably to warp the plates out of shape it is desirable that the pins 22, 22 engaging the margins of the shoe be in a direct line of thrust with the abutment surfaces 23a, 23a of the bracing plate 23, despite the fact that the pulling screws are mounted above the plates. It is desirable also that the pull be effected closely along the surface of the airfoil, and to these ends the portions 21, 21 may be bent out of the plane of the member 20 as is shown, for example, in Figs. 2 and 3.

In the embodiment of Figs. 5 and 6, like parts are given the same reference numerals as in the first described embodiment. The embodiment of Figs. 5 and 6 differs from that hereinabove described only in the respect of the members or structures engaging the margin of the shoe and the row of holding pins. In order to facilitate the adaptation of the margin-engaging member with apertures of different spacing the member, indicated at 30, may have end portions 31, 31 pivoted for at least some degree of movement with respect to the member 30, which end parts 31, 31 carry pins 32, 32 for reception in the apertures of the shoe. The end parts 31, 31 may be bent out of the plane of the member 30 so as to maintain the pins 32, 32 in a direct thrust line with the temporary pins 19, 19. For maintaining the pivoted end portions 31, 31 in the desired angular relationship with the arm 30, the latter may have limiting bosses 33, 33 overhanging the end parts 31, 31, and adjustable screws 34, 34 may be provided in such bosses to permit adjustment of the limiting movement. The bracing plate indicated at 35 is in this embodiment shown as a rectangular plate, the forward edge of which bears against the temporary pins 19, 19. The posts 24, 24 are set well back on this plate to afford clearance for the clevises 26, 26 so that the apertures 15, 15 of the shoe may be brought into complete alignment with the pins 19, 19.

While it is feasible to use only one of the pulling screws with a single grip on the shoe, the twin screw arrangements as described herein have the advantage that the stresses are less localized in the shoe and a more rapid procedure is made possible.

Variations may be made without departing from the scope of the invention as it is defined in the following claims.

I claim:

1. Apparatus for drawing a covering to a position upon an aircraft surface, said apparatus comprising a bracing structure adapted to engage an element on said surface, means for engaging a margin of said covering and means interengaging said bracing structure and the margin-engaging means for drawing the latter into an overlapping relation with said element for attachment of said margin to said element.

2. Apparatus for drawing a covering to a position upon an aircraft surface, said apparatus comprising a bracing structure adapted to engage an element on said surface, means for engaging a margin of said covering, and screw means interengaging said bracing structure and the margin-engaging means for drawing the latter into an overlapping relation with said element for attachment of said margin to said element.

3. Apparatus for stretching an elastic covering to a fastening position upon an aircraft surface, said apparatus comprising a bracing structure adapted to engage holding means at said fastening position, means for engaging a margin of said covering, and means for drawing the margin-engaging means into an overlapping relation with said holding means for attachment of said margin to said holding means, engaging surfaces of said margin-engaging means and said bracing structure being in substantially a direct line of thrust when the apparatus is in operative position on said surface.

4. Apparatus for stretching an elastic covering to a fastening position upon an aircraft surface, said apparatus comprising a plate member adapted to be disposed on said surface and having a portion for engaging a holding element on said surface, a member for engaging a margin of said covering, a screw-supporting structure on said plate member spaced from said portion thereof, a screw threaded through said screw-supporting structure, and means at an end of said screw for securing it to the margin-engaging member, the last said means and said margin-engaging member being movable by the screw to a position overlying said portion of the plate member.

5. Apparatus for stretching an elastic covering to a fastening position upon an aircraft surface, said apparatus comprising a bracing structure adapted to engage an element on said surface, means for engaging a margin of said covering, and screw means comprising a plurality of spaced-apart screws interconnected with said bracing structure and the margin-engaging means for drawing the latter into an overlapping relation with said element for attachment of said margin to said element.

6. Apparatus for stretching an elastic covering to a fastening position upon an aircraft surface, said apparatus comprising a plate member adapted to be disposed on said surface and having a forward portion for engaging a plurality of holding elements on said surface, a member for engaging a margin of said covering, a plurality of spaced-apart screw-supporting structures on said plate member rearward of said portion, a screw for each screw-supporting structure, and means at ends of the screws for connecting them pivotally with the margin-engaging member.

7. Apparatus as defined in claim 6 in which the margin-engaging member comprises end parts having pin means for engaging in apertures in said margin, which pin means are movable into overlapping relation with said holding elements.

8. Apparatus as defined in claim 6 in which the margin-engaging member comprises end parts adjustably mounted on said member and having pin means for engaging in apertures in said margin, which pin means are movable into overlapping relation with said holding elements.

9. Apparatus for stretching an elastic covering having an apertured margin into alignment of the aperture with holding means upon aircraft surface, said apparatus comprising a bracing structure adapted to engage the holding means on said surface, means for engaging the margin of said covering including an element positionable in the aperture thereof, and means interengaging said bracing structure and the margin-engaging means for drawing the latter toward said bracing structure to bring said aperture into alignment with said holding means structure and said margin-engaging means being arranged for relative movement to an overlapping relation thereof to permit insertion of fastening elements through said covering into apertures in said surface.

10. Apparatus for stretching an elastic covering having a row of apertures along a margin thereof into alignment with a row of securing apertures of an aircraft surface, said apparatus comprising means for engaging in some of the apertures of said row in the surface, means for engaging in some of the apertures in the margin of the covering, said engaging means being adapted to pass each other without interference in the plane of the covering, and forcing means for relatively moving the aperture-engaging means from a position of non-alignment to a position of alignment of the apertures of the covering with the apertures of the surface to permit entry of fastening elements through aligned apertures of the covering and apertures of the surface.

11. Apparatus for stretching an elastic covering having a row of apertures along a margin thereof into alignment with a row of securing apertures of an aircraft surface, said apparatus comprising means for engaging in some of the apertures of said row in the surface, means for engaging in some of the apertures in the margin of the covering, said engaging means being adapted to pass each other without interference in the plane of the covering, and screw means for relatively moving the aperture-engaging means from a position of non-alignment to a position of alignment of the apertures of the covering with the apertures of the surface to permit entry of fastening elements through aligned apertures of the covering and apertures of the surface.

12. Apparatus for stretching an elastic covering having a row of apertures along a margin thereof into alignment with a row of securing apertures of an aircraft surface, said apparatus comprising means for engaging in some of the apertures of said row in the surface, means for engaging in some of the apertures in the margin of the covering, said engaging means being adapted to pass each other without interference in the plane of the covering, and a plurality of forcing means for relatively moving the aperture engaging means from a position of non-alignment to a position of alignment of the apertures of the covering with the apertures of the surface to permit entry of fastening elements through aligned apertures of the covering and apertures of the surface.

RUSSELL S. COLLEY.

CERTIFICATE OF CORRECTION.

Patent No. 2,353,650. July 18, 1944.

RUSSELL S. COLLEY.

It is hereby certified that error appears in the printed specification of the above numbered patent requiring correction as follows: Page 3, first column, line 1, claim 9, after the word "upon" insert --an--; line 10, same claim, for "holding means" read --holding means, said bracing--; and that the said Letters Patent should be read with this correction therein that the same may conform to the record of the case in the Patent Office.

Signed and sealed this 31st day of October, A. D. 1944.

Leslie Frazer (Seal) Acting Commissioner of Patents.